(12) United States Patent
Kerhoas et al.

(10) Patent No.: US 11,296,498 B2
(45) Date of Patent: Apr. 5, 2022

(54) METHOD AND SYSTEM FOR PROTECTING AGAINST VOLTAGE SURGES

(71) Applicant: SAGEMCOM BROADBAND SAS, Rueil Malmaison (FR)

(72) Inventors: Florian Kerhoas, Rueil Malmaison (FR); Mathieu Abrahami, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 167 days.

(21) Appl. No.: 16/651,750

(22) PCT Filed: Sep. 28, 2018

(86) PCT No.: PCT/EP2018/076491
§ 371 (c)(1),
(2) Date: Mar. 27, 2020

(87) PCT Pub. No.: WO2019/063800
PCT Pub. Date: Apr. 4, 2019

(65) Prior Publication Data
US 2020/0244066 A1    Jul. 30, 2020

(30) Foreign Application Priority Data
Sep. 29, 2017   (FR) ...................... 1759066

(51) Int. Cl.
*H02H 9/04* (2006.01)
*H02H 5/00* (2006.01)
(Continued)

(52) U.S. Cl.
CPC .............. *H02H 9/04* (2013.01); *H02H 5/005* (2013.01); *G01S 13/95* (2013.01); *G01W 1/00* (2013.01); *G01W 1/16* (2013.01)

(58) Field of Classification Search
CPC .......... H02H 9/04; H02H 5/005; G01S 13/95; G01W 1/00; G01W 1/16
See application file for complete search history.

(56) References Cited

U.S. PATENT DOCUMENTS 6,130,412 A * 10/2000 Sizemore ................. F24C 7/08
                                                   219/414
6,674,625 B1    1/2004 Page
(Continued)

FOREIGN PATENT DOCUMENTS

FR          2 843 839 A1    2/2004
WO    WO 2002/007283 A1    1/2002

OTHER PUBLICATIONS

International Search Report as issued in International Patent Application No. PCT/EP2018/076491, dated Jan. 2, 2019.

*Primary Examiner* — Scott Bauer
(74) *Attorney, Agent, or Firm* — Pillsbury Winthrop Shaw Pittman LLP

(57) ABSTRACT

A method for protecting an electronic system against a voltage surge, which electronic system is connected to a telecommunication network and includes a control integrated circuit, the method including successively connecting the electronic system to a remote server containing meteorological data; recovering meteorological data originating from the remote server; analyzing by the control circuit the recovered meteorological data to assign thereto a danger level of the current or imminent meteorological event; and, when the assigned danger level exceeds a main warning threshold: sending by the control circuit a warning signal to a display terminal connected to the electronic system; displaying a first warning message on the display terminal from information contained in the warning signal, the first warning message warning a user of the display terminal of a risk of voltage surge due to the current or imminent meteoro- (Continued)

Figure 1:
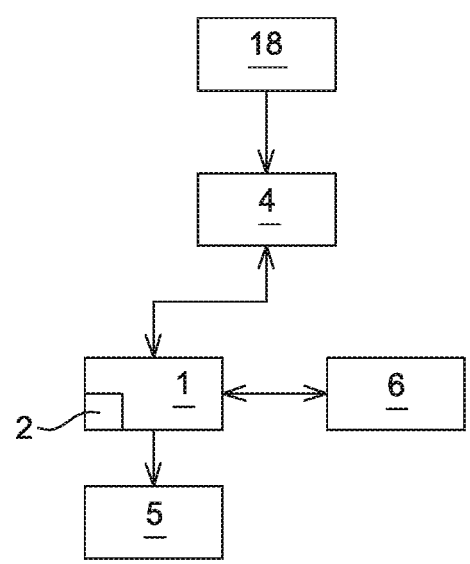

logical event; and electrical isolating a port of the electronic system.

16 Claims, 3 Drawing Sheets

(51) Int. Cl.
*G01S 13/95* (2006.01)
*G01W 1/16* (2006.01)
*G01W 1/00* (2006.01)

(56) References Cited

U.S. PATENT DOCUMENTS

| | | | |
|---|---|---|---|
| 9,748,759 B1 | 8/2017 | Bergeron et al. | |
| 2007/0010916 A1* | 1/2007 | Rodgers | H02J 3/14 700/295 |
| 2011/0046809 A1 | 2/2011 | Fickey | |
| 2013/0338920 A1* | 12/2013 | Pasken | G01W 1/00 702/3 |
| 2015/0350404 A1* | 12/2015 | Wakameda | H04W 4/90 455/404.2 |
| 2016/0018563 A1 | 1/2016 | Candor | |
| 2017/0110873 A1* | 4/2017 | Glovinski | H02S 40/30 |
| 2019/0349215 A1* | 11/2019 | Okura | G08B 21/10 |

\* cited by examiner

METHOD AND SYSTEM FOR PROTECTING AGAINST VOLTAGE SURGES

CROSS-REFERENCE TO RELATED APPLICATIONS

This is the U.S. National Stage of PCT/EP2018/076491, filed Sep. 28, 2018, which in turn claims priority to French Application No. 1759066, filed Sep. 29, 2017, the entire contents of all applications are incorporated herein by reference in their entireties.

The invention falls within the technical field of the protection of electrical installations against voltage surges being able to be caused by meteorological events, such installations being connected to an electrical supply network.

The invention more particularly relates to a method for protecting an electronic system against voltage surges caused during particular meteorological events, notably voltage surges caused by lightning in the event of a thunderstorm.

It is in fact well known that, during a lightning strike on the lines of an electrical network, there exists a risk of damaging the electrical installation connected to the network due to the voltage surge caused by the lightning and passing through the installation.

To avoid damaging the electrical installation in the event of a voltage surge, it is well known to integrate passive components, such as varistors or circuit breakers, in the electrical installation. The passive component enters into action in the event of a voltage surge, either by disconnecting the electrical installation from the network (circuit breaker), or by absorbing the additional electrical energy due to the voltage surge (varistor). However, such components have the drawback of deteriorating over time and can only absorb a limited amount of energy.

Also known from the document WO2002007283 is a device and a method for protecting an electrical installation against lightning. The device in question comprises means for monitoring the electromagnetic activity of the atmosphere, and if this electromagnetic activity exceeds a determined warning level, then the protection device disconnects the electrical installation from the network.

However, these variations in atmospheric electromagnetic activity result from the propagation in the atmosphere of electromagnetic waves generated by lightning. Thus, the monitoring means of the protection device must necessarily await the occurrence of lightning to enable the device to disconnect the installation from the network. There thus subsists a non-negligible risk that lightning damages the electrical installation before the protection device disconnects the installation from the network.

The invention thus aims to propose a method for protecting an electronic system against voltage surges that is more reliable and offering a high level of security.

To this end, the invention proposes a method for protecting at least one electronic system against a voltage surge likely to be caused by a current or imminent meteorological event, which electronic system is connected to a telecommunication network and comprises a control integrated circuit, the method comprising successively:

a step of connecting the electronic system to a remote server containing meteorological data;
a step of recovering meteorological data originating from the remote server;
a step of analysis by the control circuit of the recovered meteorological data to assign thereto a danger level of the current or imminent meteorological event;
when the assigned danger level exceeds a main warning threshold recorded in a memory space of the control circuit, a step of electrical isolation commanded by the control circuit of at least one port of the electronic system.

Thus, the method makes it possible, from the analysis of meteorological data collected in real time, to disconnect the electronic system from the electrical network to protect it from voltage surges in the event of an adverse meteorological event, such as a thunderstorm, and does so before the meteorological event detected causes a voltage surge, for example due to lightning generated in the course of this thunderstorm.

The protection method of the invention may also comprise the following optional characteristics considered in isolation or according to all technically possible combinations thereof:

Following the step of electrical isolation and after a determined time, a step of electrical reconnection of the considered port initiated by a time out module of the control circuit.

Prior to the step of electrical isolation (and when the assigned danger level exceeds the main warning threshold), the method comprises a step of sending by the control circuit a warning signal to a display terminal connected to the electronic system.

Prior to the step of electrical isolation (and when the assigned danger level exceeds the main warning threshold), the method comprises an additional step of displaying a first warning message on the display terminal from information contained in the warning signal, the first warning message warning a user of the display terminal of a risk of voltage surge due to the current or imminent meteorological event.

The method comprises the additional step of displaying at least one command button on the display terminal and associating the button with the transmission of a command to the electronic system intended to control the step of electrical isolation.

The warning signal is configured to switch on the display terminal when said terminal is switched off.

The method comprises, when the danger level assigned to the recovered meteorological data exceeds an additional warning threshold below the main warning threshold, an additional step of displaying on the display terminal a datum informing the user of the impending arrival of a meteorological event likely to generate a voltage surge.

The method comprises a time out step before the step of isolating at least one port of the electronic system, the time out period being able to be set by a user of the terminal.

The time out period is contained in the warning signal and the display terminal is isolated from an electrical network at the end of the time out period.

The step of connecting the electronic system to the remote server comprises a sub-step of sending to the remote server a request to collect meteorological data, the request comprising geolocation information of the electronic system.

The step of recovering meteorological data is carried out in real time and comprises the following sub-steps:
collecting and saving meteorological data sent by the remote server;

repeating this sub-step of collecting and saving data according to a determined period of which the value is recorded in the memory space of the control circuit.

The step of analysing meteorological data comprises at least the following sub-steps:
  partitioning the meteorological data to extract temperature, pressure, humidity level and wind speed and direction data,
  correlating the extracted data to assign thereto a danger level from a level scale recorded in the memory space of the control circuit.

The step of analysing meteorological data comprises at least the following sub-steps:
  partitioning the meteorological data to extract a warning level calculated by the remote server;
  analysing the warning level of the remote server to assign thereto a danger level from a level recorded in the memory space of the control circuit.

The method comprises a step of generating a second warning message by the control circuit, intended to be sent to every computer terminal or peripheral in communication with the electronic system, the second warning message warning of the risk of voltage surge due to the current or imminent meteorological event.

The invention also relates to an electronic system, notably a decoder, and which is essentially characterised in that it comprises a control integrated circuit having a memory space, the electronic system further comprising a power supply port to an electrical network, at least one network input port to connect the system to a wide area computer network, at least one multimedia output port to connect the electronic system to a display terminal, the control circuit being suited to successively:
  connect the electronic system to a remote server containing meteorological data;
  recover and analyse meteorological data originating from the remote server in order to determine and assign a danger level of a current or imminent meteorological event likely to generate a voltage surge at least in the electronic system;
  electrically isolate at least one of the ports of the electronic system when the assigned danger level exceeds a warning threshold recorded in the memory space.

The electronic system of the invention may also comprise the following optional characteristics considered in isolation or according to all technically possible combinations thereof:
  The control circuit is suited, prior to the electrical isolation (and when the assigned danger level exceeds a main warning threshold), to sending a warning signal to the display terminal, the warning signal containing information making it possible to display a warning message on the display terminal in order to warn a user of the display terminal of a risk of voltage surge due to the current or imminent meteorological event.
  The control circuit is suited to reconnecting the considered port after a determined time, by means of a time out module of the electronic system.
  The control integrated circuit of the electronic system comprises a cut-off circuit comprising electrically controlled circuit breakers, the circuit breakers being respectively mounted in respective power supply lines of the considered ports and driven by the control circuit.

The invention also relates to a computer programme comprising instructions which, when the programme is executed by computer, lead said computer to implement the steps of the method such as described previously.

The invention finally relates to computer readable storage means, on which is recorded the computer programme such as described above.

Figure 2:
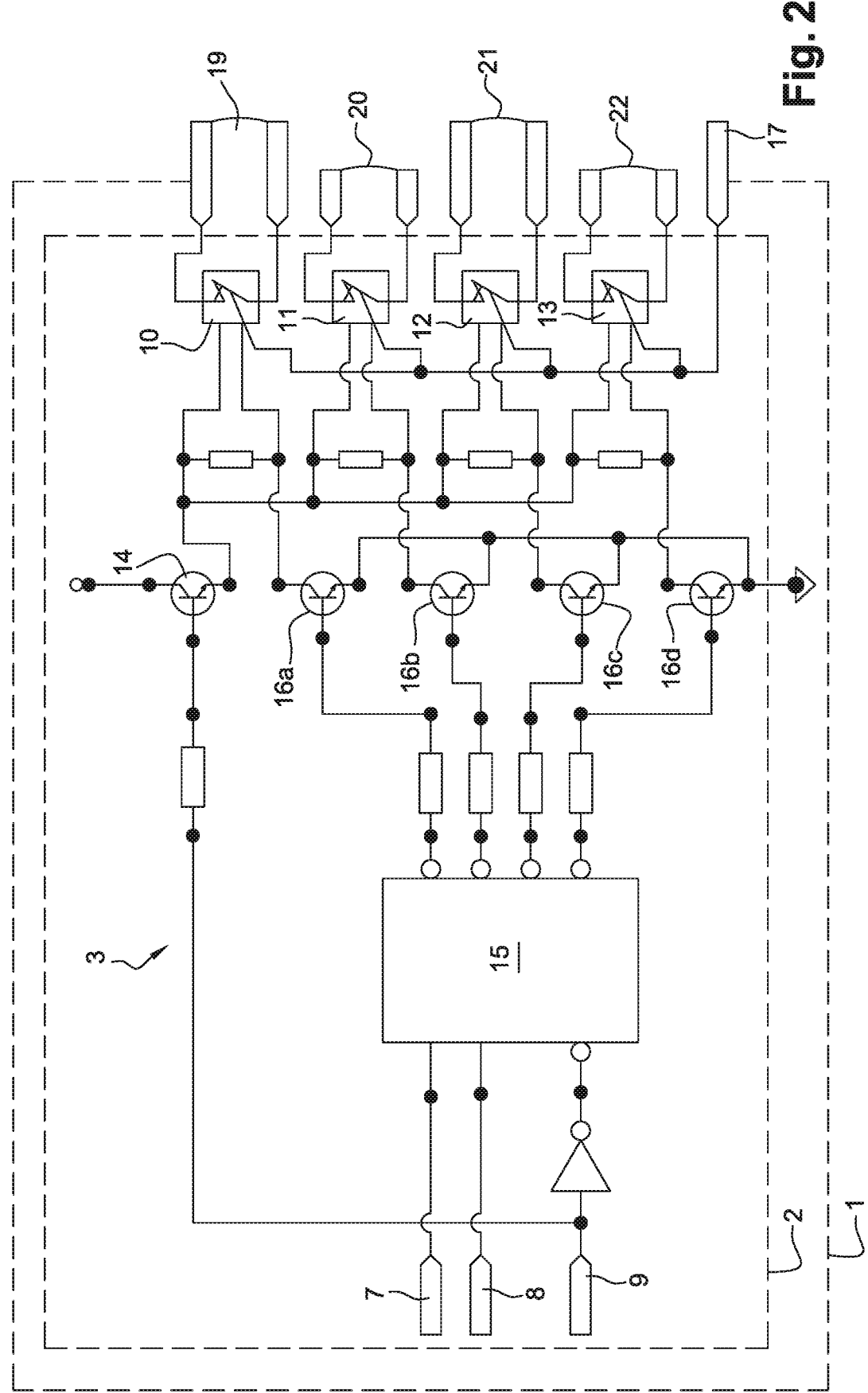
Figure 3:
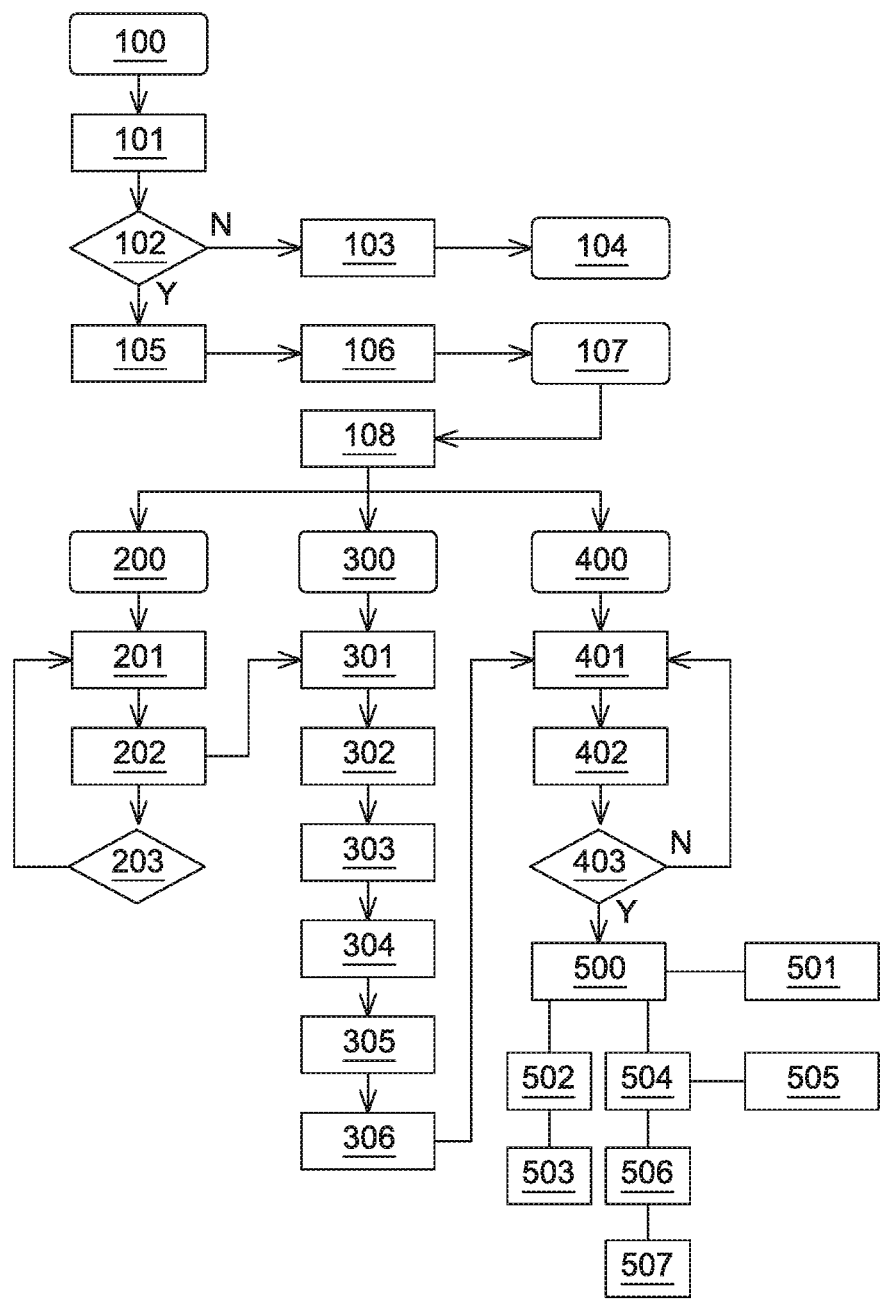

Other characteristics and advantages of the invention will become clear from the description that is given thereof below, as an indication and in no way limiting, with reference to the appended figures among which:

FIG. 1 is a diagram representing the integration of the electronic system of the invention in a network environment, FIG. 2 is a diagram of an electrical circuit of the electronic system according to an embodiment, making it possible to trigger circuit breakers for disconnecting at least one port of said electronic system, and FIG. 3 is a diagram illustrating the main steps of the protection method of the invention.

It is firstly specified that, in the figures, the same references designate the same elements whatever the figure in which they appear and whatever the form of representation of these elements. Similarly, if elements are not specifically referenced in one of the figures, their references may easily be found by referring to another figure.

It is also specified that the figures essentially represent one embodiment of the object of the invention but that other embodiments that meet the definition of the invention may exist.

With reference to FIGS. 1 and 2, the electronic system 1 comprises a control integrated circuit 2, itself comprising at least a memory space, a processor for processing data, a plurality of input 21 and output 20, 22 ports for integrating the electronic system 1 in a telecommunication environment of which the characteristics will be developed hereafter. The decoder 1 is of course connected to the domestic electrical network via an electricity supply port 19, in order to be supplied with energy.

Moreover, the control circuit 2 of the electronic system 1 comprises an electronic cut-off circuit 3 suited to disconnecting the power supply lines of the ports 19-22 of the electronic system 1. This cut-off circuit 3 and its operation will be described in detail hereafter.

The electronic system 1 is intended to be integrated in a local network for example of TCP/IP type, this local network forming part of the telecommunication environment. The electronic system 1 is thus connected to every peripheral and/or terminal connected to the local network. As a preferential and non-limiting example, the electronic system 1 is a decoder (also known as a "set top box"). In the remainder of the description, for greater clarity, the term "decoder" will be used to define the electronic system 1 of the invention.

The decoder 1 is connected through a gateway 4 to a wide area network of internet type, for example according to a TCP/IP protocol, this wide area network forming part of the telecommunication environment. This decoder 1 is also connected to a display terminal 5, for example a television comprising at least one input port to a multimedia interface, preferentially a HDMI (High-Definition Multimedia Interface) input port. The decoder 1 thus comprises at least one HDMI output port 20 for connecting to the television 5.

Moreover, the decoder 1 comprises at least one network input port 21 and optionally a network output port 22, for example of Ethernet type. Thus, the decoder 1 is connected to the gateway 4 via its Ethernet input port 21, which makes it possible to receive content originating from the wide area network. The decoder is also suited to be connected to an external peripheral 6, for example through its Ethernet output port 22, or instead by means of an output port of USB (Universal Serial Bus) type, or simply by means of the gateway 4 to which the external peripheral 6 is connected.

In addition, the decoder 1 comprises TV input and output ports for receiving and transmitting signals originating from a TV antenna.

According to the invention, the control circuit 2 of the decoder 1 is suited to recovering and analysing meteorological data, with the aim of defining meteorological events in real time and thus determining a danger level of these events, according to a scale contained in a database recorded in the memory space of the control circuit 2. For example, this database comprises ten levels numbered from one to ten, and each level corresponds to a particular meteorological event. The higher the level, the more adverse the meteorological event and the greater the risk that the meteorological event will generate a voltage surge in the decoder 1, for example due to a flash of lightning produced during this event.

Table I below illustrates the correspondence between the danger level and the meteorological event.

TABLE I

Correspondence between danger levels and meteorological events.

| | |
|---|---|
| 1 | Sunny, clear |
| 2 | Short cloudy periods, mist, sunny intervals |
| 3 | Slightly overcast, light rain showers, sunny intervals |
| 4 | Overcast with showers |
| 5 | Stratus, light rain |
| 6 | Moderate rain, widely overcast |
| 7 | Heavy rain |
| 8 | Light thunderstorms |
| 9 | Moderate thunderstorms |
| 10 | Heavy thunderstorms |

Thus, when the level assigned to a current meteorological event (i.e. which has already started) or imminent meteorological event (i.e. on the point of beginning) by the control circuit 2 exceeds a determined main threshold, then the control circuit 2 sends an electrical signal to the cut-off circuit 3 to define a sequence of electrical isolation of the different ports 19-22 of the decoder 1. A warning and electrical isolation procedure, forming an integral part of the protection method of the invention, will be described in detail hereafter.

With reference to FIG. 2, the electrical cut-off circuit 3 comprises first, second and third input/output connectors for general usage 7, 8, 9, commonly called GPIO (General Purpose Input/Output) connectors, and which enable the control circuit 2 to drive the cut-off circuit 3. The GPIO connectors 7, 8, 9 enable the control circuit 2 to drive the circuit breakers 10, 11, 12, 13 of the cut-off circuit 3. The circuit breakers 10-13 are respectively mounted on the electricity supply lines of the respective ports 19-22 of the decoder 1. Moreover, the respective activation of the circuit breakers 10-13 is made possible by the activation by the GPIO connectors 7, 8, 9 of respective transistors 16a, 16b, 16c, 16d integrated in the cut-off circuit 3.

In particular, the circuit breaker 10 makes it possible to electrically isolate the power supply port 19 of the decoder 1 which is connected to the electrical network, the circuit breaker 11 makes it possible to isolate the HDMI output port 20, the circuit breaker 12 makes it possible to isolate the Ethernet output port 22 and the circuit breaker 13 makes it possible to isolate the Ethernet input port 21.

Each GPIO connector 7-9 may adopt a particular logic state (0 or 1), this logic state being assigned by the control circuit 2. When the logic state of a GPIO connector is configured to 0, it then plays the role of output and thus cannot send signals to the considered circuit breaker 10-13. On the other hand, when the logic state of a GPIO connector is configured to 1, it plays the role of input and can send signals to the considered circuit breaker 10-13.

In the logic state 1, the first GPIO connector 7 activates a first transistor 14 to make it possible to trigger the electrical isolation of at least one of the ports 19-22 of the decoder 1. The second 8 and third 9 GPIO connectors enable the control circuit 2 to drive the circuit breakers 10-13 according to a determined sequence to select the power supply lines of the ports 19-22 of the decoder 1 that will be isolated from the electrical network. Thus, the open or closed state of the circuit breakers 10-13 depends on the combination of states of the second and third GPIO 8, 9. These combinations and their effect on the active (1) or inactive (0) state of the circuit breakers 10-13 obeys a truth table illustrated in table II below.

TABLE II

Truth table of the logical states of the GPIO connectors 7-9 and effect on the circuit breakers (C.B.) 10-13.

| GPIO 7 | GPIO 8 | GPIO 9 | C.B. 10 | C.B. 11 | C.B. 12 | C.B. 13 |
|---|---|---|---|---|---|---|
| 0 | 0 | 0 | 0 | 0 | 0 | 0 |
| 0 | 0 | 1 | 0 | 0 | 0 | 0 |
| 0 | 1 | 0 | 0 | 0 | 0 | 0 |
| 0 | 1 | 1 | 0 | 0 | 0 | 0 |
| 1 | 0 | 0 | 1 | 0 | 0 | 0 |
| 1 | 0 | 1 | 0 | 1 | 0 | 0 |
| 1 | 1 | 0 | 0 | 0 | 1 | 0 |
| 1 | 1 | 1 | 0 | 0 | 0 | 1 |

A circuit breaker 10-13 in its active state (1) opens the electricity supply line of the considered port 19-22, that is to say isolates said port from the electrical network.

Thus, as an example, to generate the electrical isolation of the HDMI port 20, that is to say to close the circuit breaker 11, the control circuit 2 must send an instruction that will place the first 7 and third 9 GPIO connectors in the logic state 1 and the second GPIO connector 8 in the logic state 0, according to the truth table illustrated in table II above. As illustrated in FIG. 3, the combination of the states of the second 8 and third 9 GPIO connectors is demultiplied by a demultiplier 15 before activating at least one of the transistors 16a-16d specific to the considered circuit breaker 10-13.

The successive isolation of the different ports 19-22 will thus be realised by the successive sending by the control circuit 2 of instructions controlling the logic state of the three GPIO connectors 7, 8, 9.

Finally, the control circuit 2 comprises a time out module 17 which makes it possible to deactivate the circuit breakers 10-13 in order to reconnect the considered ports of the decoder 1 to the electrical network, and does so after a determined time. In order to be supplied permanently, this time out module 17 is connected to a battery type accumulator mounted in the decoder 1.

According to the invention, a computer programme is recorded in the memory space of the control circuit 2. This programme is intended to be executed by the processor of the control circuit 2 to implement the method for protecting the decoder 1, and if need be the television 5 and other peripherals 6 connected to the decoder 1, against voltage surges which can be caused by particular meteorological events, notably thunderstorms.

The protection method of the invention is described with reference to FIG. 3.

The protection method is initiated by the control circuit 2 of the decoder 1 from the moment that the latter is supplied with power, for example by the user. The control circuit 2 launches the programme as a background task 100, said programme loading all the parameters necessary for the implementation of the steps of the method. These parameters are the threshold for triggering a warning, the sequence of ports 19-22 to isolate, and first and second time out durations.

The triggering threshold corresponds to the danger level from which the protection method initiates the warning and isolation procedure due to a risk of voltage surge. The first time out period corresponds to the time limit between the generation of a warning and the triggering of the electrical isolation of the ports 19-22. The second time out period corresponds to the time limit between the isolation of the power supply lines of the ports 19-22 of the decoder 1 and the reconnection of these different lines by the time out module 17.

The user is further able to modify these different parameters relative to the implementation of the method by driving a graphic interface with the remote control of the decoder, or instead directly with physical buttons on the front of the decoder 1. The parameters adjustable by the user will be returned to hereafter.

In the course of the first step 101 of the method, the control circuit 2 of the decoder 1 connects said decoder 1 to a remote server 18 containing meteorological data (FIG. 1). This connection is made by sending a request according to a HTTP (HyperText Transfer Protocol), or HTTPS protocol to benefit from a secure connection. This request also comprises the geographic coordinates of the decoder 1. If need be, the decoder 1 can be connected to several remote servers 18.

If the remote server 18 does not respond to the connection request 102N, an error message 103 is broadcast on the television 5 and the programme stops 104.

If the remote server responds 102Y, the connection between the decoder 1 and the remote server 18 is established. The control circuit 2 consults 105, recovers 106 and then prepares 107 the values of the different parameters enabling the implementation of the steps of the method, these values being memorised in the memory space of the control circuit 2. More precisely, when the user modifies the parameters via the graphic interface, the values of the parameters are consulted 105 and recovered 106 by the control circuit 2 via a Websocket link (network protocol known to those skilled in the art) between said control circuit 2 and the graphic interface, using a RPC (Remote Procedure Call) protocol. The main programme then launches 109 three algorithms 200, 300, 400 which are going to enable respectively the collection of meteorological data, the analysis of the collected meteorological data to identify the meteorological event, and the establishment of a danger level of the meteorological event.

In the course of the second step of the method 201-203, the control circuit 2 recovers 201 meteorological data from the remote server while sending to it data corresponding to the geographic location of the decoder. The data received are then formatted 202 by the control circuit 2 in a textual data format, such as "JavaScript Object Notation" (JSON) or "eXtensible Markup Language" (XML) or in a binary data format, such as "MessagePack", and recorded 301 in the memory space of the control circuit 2. These meteorological data contain information on the current climate, but also climate forecasts for the days to come. Optionally, these meteorological data also comprise a climatic warning level established by the remote server 18. As a non-limiting example, the green, yellow, orange, red and violet weather warnings of Météo France may be cited.

This step of recovering data is executed periodically 203, according to a determined period. Typically, the collection of data is carried out each minute by the control circuit 2.

In the course of the third step of the method, the algorithm for analysing the meteorological data is going to parse the collected data 302, that is to say that it is going to extract parts of the meteorological data collected and classify them. In particular, the algorithm is going to extract from the meteorological data the atmospheric pressure, the temperature, the wind speed and direction and the humidity level of the air, and if need be the climatic warning level established by the remote server 18.

In the course of the fourth step of the method 303, 304, the algorithm for analysing meteorological data is going to analyse the variations in atmospheric pressure over time 303, as well as the variations in temperature over time 304. It is for example known that a reduction in the atmospheric pressure from 1 hectopascal to 2 hectopascals per hour is a thunderstorm and storm indicator. Moreover, the algorithm performs a correlation between the variations in atmospheric pressure and temperature to detect the risks of thunderstorm: the algorithm analysing the meteorological data makes it possible to study the variation in these data over variable time scales. The algorithm then recreates a set of data representing the derivative of values over several time scales. The critical levels are reached for negative derivatives between the pressure and time, as well as for temperature and time, on scales of one to two hours. The algorithm also defines the correlation between the temperature and the pressure, which makes it possible to see dramatic decreases in the current atmospheric condition and thus to make it possible potentially to trigger warnings.

In the course of the fifth step of the method 305, 306, the analysis algorithm 300 studies the variations in wind speed and direction to establish a climatic context 305, that is to say to assign a textual danger level from the database of the meteorological events represented in table I. This climatic context is thus representative of a current or forthcoming meteorological event and is deduced from the pressure, wind speed and direction and temperature data analysed previously.

Moreover, to avoid false detections of adverse meteorological events, the algorithm 300 may analyse other meteorological parameters extracted from the collected data, such as the humidity level, the position of low, medium and high altitude clouds, as well as the George index or K-index, which is an air stability index and represents the thunderstorm potential. The climatic context, representative of the complete analysis of the meteorological data, is then recorded 306 in the memory space of the control circuit 2.

Alternatively, when the climatic warning level established by the remote server 18 is comprised in the meteorological data, the fourth and fifth steps of the method described above are replaced by a single step of analysis of the climatic warning level established by the remote server 18. This step leads to the recording 306 in the memory space of the control circuit 2 of the climatic context representative of this climatic warning level.

In the course of the sixth step of the method 401,402, the climatic context is sent 401 to the algorithm for establishing a danger level of the climatic event 400. The algorithm 400 then assigns a danger level to the meteorological event determined previously 402, using the database represented in table I. The assigned level is thus comprised between 1 and 10 and represents the danger level of the meteorological event stemming from the climatic context.

In the course of the seventh step of the method 403, the algorithm 400 assesses if the danger level reaches or exceeds the main warning triggering threshold. As mentioned above, the threshold is determined and recorded in the memory space of the control circuit 2. It can also be parameterised by the user by driving the appropriate graphic interface with the remote control of the decoder 1. For example, the user may choose to set the threshold at 8, that is to say slightly stormy.

If the danger level is below the main warning threshold, then a new collection and analysis of meteorological data is carried out by the algorithms 200, 300, 400. As mentioned above, the collection and the analysis of these meteorological data is carried out periodically as long as a warning is not triggered.

In the course of an eighth step of the method, if the danger level is above or equal to the main warning threshold, then the control circuit launches a warning algorithm 500 which initiates the procedure of warning of electrical isolation of at least one power supply line of the ports 19-22 of the decoder 1. Concomitantly, the control circuit 2 drives the stoppage of the periodic recovery of meteorological data.

The control circuit 2 launches a countdown before activation of the cut-off circuit 3, this countdown being able to be parameterised by the user via the graphic interface of the menu of the decoder 1 to thus set the first time out period. The control circuit 2 also generates 501 a first signal destined for the television 5. This first emitted signal is preferably a HDMI CEC (Consumer Electronics Control) signal and makes it possible to warn the electronic board of the television 5 of a climatic warning and of a risk of voltage surge. This first signal makes it possible to switch on the television 5 if the latter is switched off. The signal further comprises information for the display of a warning message on the screen of the television 5, in order to warn the user of the television 5 of the risk of voltage surge. Thus, the user is informed in advance of the risk of voltage surge and of an impending electrical isolation, which leaves him the possibility of undertaking actions, for example manually isolating other items of equipment.

The display is in fact another graphic interface which describes the current warning. Command buttons are further advantageously displayed on the screen of the television 5, each button being associated with the transmission of a command to the control circuit 2 for controlling the different parameters of the warning and electrical isolation procedure. In particular, the user may choose to ignore the remainder of the isolation procedure or to trigger it before the end of the first time out period, or choose which power supply lines of the ports 19-22 of the decoder 1 he wishes to isolate.

In parallel, the control circuit 2 generates a textual or binary data message 502, for example in JSON format, which contains a description of the warning and the first time out period before launching by the control circuit 2 of the electrical isolation of at least one of the ports 19-22 of the decoder 1. This message is next sent 503 on the local network destined for the peripherals 6 connected to this network and thus to the decoder 1, using a UDP type protocol to broadcast the message to all of the communicating devices on the TCP/IP network. Thus, if the peripherals concerned have a functionality making it possible to receive and decode the JSON message, they will also be able to disconnect from the electrical network at the end of the first time out period.

Similarly, the first time out period is contained in the HDMI CEC signal sent to the television 5, with the result that the electronic board of the latter will drive the closing and the isolation of the electrical network of the television 5 at the end of the first time out period.

Concomitantly with steps 501 and 502, the control circuit 2 sends an electrical signal 504 to the GPIO connectors 7, 8, 9 of the cut-off circuit 3. This signal assigns a logic state to each GPIO connector 7, 8, 9 according to a sequence making it possible to isolate 505 electrically and successively at least one of the ports 19-22 of the decoder 1 by activating the considered circuit breakers 10-13, as is described above. It should be noted that the circuit breakers 10-13 make it possible if need be to discharge a surplus of electrical energy in the event of voltage surge.

By default, if the user has not modified the parameters of the isolation procedure, the HDMI and Ethernet 20, 21, 22 ports are successively disconnected from the electrical network, then the power supply port 19 is finally disconnected to switch off the decoder 1.

The electronic signal sent to the cut-off circuit 3 is also received 506 by the time out module 17 which starts the second time out period before re-initiation: at the end of the second time out period recorded in the memory space of the control circuit 2, a re-initiator of the time out module 17 (which is supplied with electrical energy by battery) electrically reconnects 507 the power supply port 19 and the Ethernet input port 21 to reconnect the decoder 1 to the wide area network. The control circuit 2 then carries out a collection and an analysis of new meteorological data to determine a new danger level.

If this new danger level is still above the main warning threshold, the control circuit 2 once again drives the stoppage of the decoder. If the new level is below the main threshold, then the control circuit 2 sends an electrical signal to the GPIO connectors to command the reconnection to the electrical network of the ports 19-22 of the decoder 1 which have been isolated, by deactivating the considered circuit breakers 10-13 (which makes it possible to close the power supply lines of the considered ports 19-22).

The second time out period, of a duration for example comprised between one minute and forty eight hours, may be parameterised by the user via the graphic interface of the decoder 1. Moreover, this second time out period is also integrated in the JSON message sent by the control circuit 2 to the peripherals and in the HDMI CEC signal sent to the television 5. At the end of the second time out period, the respective electronic boards of the television 5 and the peripherals could then drive the switching on of the latter if they have such functionalities at their disposal.

Optionally, an additional warning threshold below the main warning threshold is recorded in the memory space of the control circuit 2. Thus, when the danger level of the climatic event is below the main threshold but above or equal to the additional threshold parameterizable by the user via the graphic interface of the decoder 1, the method comprises a step (not represented) of displaying on the screen of the television 5 a datum informing the user of the impending or probable arrival of a meteorological event likely to generate a voltage surge. It is clearly understood that, in this particular case, the warning and isolation procedure is not initiated. For example, this additional threshold may be set at 7, that is to say to correspond to heavy rain.

On the basis of the detection of an adverse climatic context, that is to say risking causing voltage surges, the electronic system 2 and the protection method according to the invention function in a preventive manner. Indeed, it is provided to isolate the electronic system 2 itself and the different terminals and peripherals to which it is connected before a single flash of lightning has been generated due to an adverse meteorological event. The electronic system 2 of the invention thus implements a protection method of the invention that is more reliable and offering a high level of security.

The embodiment described above is in no way limiting and modifications may be made thereto without going beyond the scope of the invention. For example, the control circuit 2 comprising the circuit cut-off 3 and having in memory the programme implementing the steps of the protection method according to the invention may be directly integrated in the gateway 4 connected to the wide area network, or in an independent electronic package connected to the decoder 1 and to the wide area network.

The invention claimed is:

1. A method for protecting at least one electronic system against a voltage surge likely to be caused by a current or imminent meteorological event, which electronic system is connected to a telecommunication network and comprises a control integrated circuit, the method comprising successively:
   a step of connecting the electronic system to a remote server containing meteorological data;
   a step of recovering meteorological data originating from the remote server;
   a step of analysis by the control circuit of the recovered meteorological data to assign thereto a danger level of the current or imminent meteorological event;
and, when the assigned danger level exceeds a main warning threshold recorded in a memory space of the control circuit:
   a step of sending by the control circuit a warning signal to a display terminal connected to the electronic system;
   a step of displaying a first warning message on the display terminal from information contained in the warning signal, the first warning message warning a user of the display terminal of a risk of voltage surge due to the current or imminent meteorological event; and
   a step of electrical isolation commanded by the control circuit of at least one port of the electronic system.

2. The method according to claim 1, comprising an additional step of displaying at least one command button on the display terminal and associating the button with the transmission of a command to the electronic system intended to control the step of electrical isolation.

3. The method according to claim 1, wherein the warning signal is configured to switch on the display terminal when said terminal is switched off.

4. The method according to claim 1, comprising, when the danger level assigned to the recovered meteorological data exceeds an additional warning threshold below the main warning threshold, an additional step of displaying on the display terminal a datum informing the user of the impending arrival of a meteorological event likely to generate a voltage surge.

5. The method according to claim 1, wherein a time out step is provided before the step of isolating at least one port of the electronic system, the time out period being able to be set by a user of the terminal.

6. The method according to claim 5, wherein the time out period is contained in the warning signal and wherein the display terminal is isolated from an electrical network at the end of the time out period.

7. The method according to claim 1, wherein the step of connecting the electronic system to the remote server comprises a sub-step of sending to the remote server a request to collect meteorological data, the request comprising geolocation information of the electronic system.

8. The method according to claim 1, wherein the step of recovering meteorological data is carried out in real time and comprises the following sub-steps:
   collecting and saving meteorological data sent by the remote server;
   repeating this sub-step of collecting and saving data according to a determined period of which the value is recorded in the memory space of the control circuit.

9. The method according to claim 1, wherein the step of analysis of the meteorological data comprises at least the following sub-steps:
   partitioning the meteorological data to extract temperature, pressure, humidity level and wind speed and direction data;
   correlating the extracted data to assign thereto a danger level from a level scale recorded in the memory space of the control circuit.

10. The method according to claim 1, wherein the step of analysis of meteorological data comprises at least the following sub-steps:
    partitioning the meteorological data to extract a warning level calculated by the remote server;
    analysing the warning level of the remote server to assign thereto a danger level from a level scale recorded in the memory space of the control circuit.

11. The method according to claim 1, comprising a step of generating a second warning message by the control circuit, intended to be sent to every computer terminal or peripheral in communication with the electronic system, the second warning message providing warning of the risk of voltage surge due to the current or imminent meteorological event.

12. An electronic system comprising a control integrated circuit having a memory space, the electronic system further comprising a power supply port to an electrical network, at least one network input port to connect the system to a wide area computer network, at least one multimedia output port to connect the electronic system to a display terminal, the control circuit being configured to successively:
    connect the electronic system to a remote server containing meteorological data;
    recover and analyse meteorological data originating from the remote server in order to determine and assign a danger level of a current or imminent meteorological event likely to generate a voltage surge at least in the electronic system;
    and, when the assigned danger level exceeds a warning threshold recorded in the memory space:
    send a warning signal to the display terminal, the warning signal containing information making it possible to display a warning message on the display terminal in order to warn a user of the display terminal of a risk of voltage surge due to the current or imminent meteorological event;
    electrically isolate at least one of the ports of the electronic system.

13. The electronic system according to claim 12, wherein the control integrated circuit comprises a cut-off circuit comprising electrically controlled circuit breakers, the circuit breakers being respectively mounted in respective power supply lines of the considered ports and driven by the control circuit.

14. A computer programme comprising instructions which, when the programme is executed by computer, lead said computer to implement the steps of the method according to claim 1.

15. A non-transitory computer readable storage medium, on which is recorded the computer programme according to claim 14.

16. The electronic system according to claim 12, wherein the electronic system is a decoder.

* * * * *